United States Patent [19]
Pagella et al.

[11] 3,781,997
[45] Jan. 1, 1974

[54] DIAMETER GAUGE FOR MACHINE TOOLS

[75] Inventors: Elio Pagella; Carlo Guerici, both of Ivrea, Italy

[73] Assignee: Ing. C. Olivetti &C., S.p.A., Ivrea, Turin, Italy

[22] Filed: Sept. 28, 1971

[21] Appl. No.: 184,566

[30] Foreign Application Priority Data
Sept. 30, 1970 Italy..........................70262 A/70

[52] U.S. Cl.............................. 33/143 L, 33/147 E
[51] Int. Cl. .............................................. G01b 5/00
[58] Field of Search ..................... 33/143 R, 143 L, 33/147 R, 147 L, 147 N, 147 E, 147 F, 147 H, 147 T, 147 K, DIG. 2, 168 AB

[56] References Cited
UNITED STATES PATENTS
3,665,743   6/1972   Frohling........................... 33/143 L
2,968,100   1/1961   Etchell............................. 33/147 E FOREIGN PATENTS OR APPLICATIONS
1,473,873   2/1967   France............................. 33/147 R

*Primary Examiner*—William D. Martin, Jr.
*Attorney*—Birch, Swindler, McKie & Beckett

[57] ABSTRACT

A diameter measuring gauge for machine tools comprising two opposed feelers both movable with respect to one another. The feelers are mounted on arms carried by sleeves that slide on a column. The arms are biased in so that the feelers contact the workpiece with the proper pressure. A hydraulic cylinder coupled to the arms drives the two arms until the feelers make initial contact with the workpiece, then the hydraulic pressure is removed. Measurement is accomplished by a pair of windings carried by the arms in juxtaposition to each other to electrically interact to produce an electrical signal proportional to the diameter of the workpiece.

6 Claims, 3 Drawing Figures

PATENTED JAN 1 1974 3,781,997
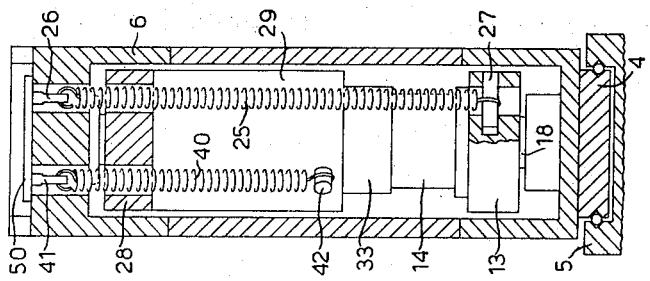
Fig. 3
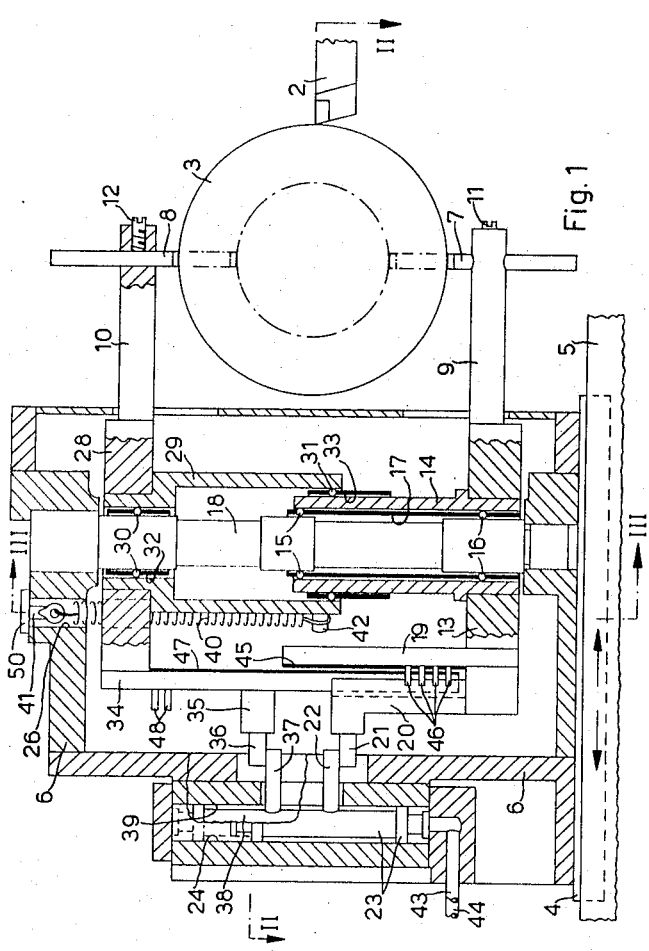
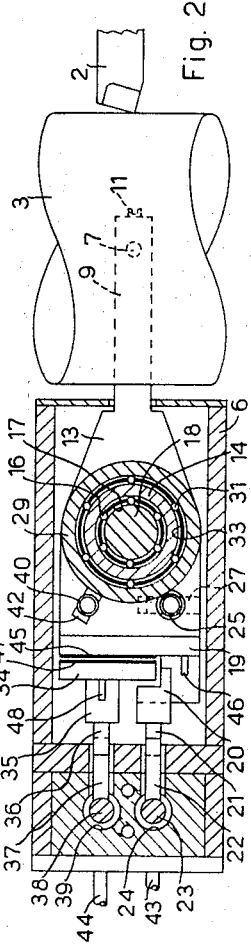
Fig. 2
Fig. 1
INVENTORS
ELIO PAGELLA
CARLO GUERCI

3,781,997

DIAMETER GAUGE FOR MACHINE TOOLS

BACKGROUND OF THE INVENTION

The present invention relates to a diameter gauge for machine tools comprising two feelers adapted to sense two diametrically opposite points of a workpiece of cylindrical cross-section disposed on the machine tool.

Diameter gauges of the aforesaid type are known in which the two feelers are connected to two transducers of capacitive type or electromagnetic type. In these devices, the capacitance of a capacitor or the magnetic flux linked with a winding is varied by the shifting of a movable element with respect to a fixed element. The capacitance or the flux gives the measurement of the diameter as the difference, generally very small, from a sample calibration diameter of the device. If it is desired to measure a plurality of diameters on the part or workpiece, the diameter gauges of the aforesaid type require a zeroizing or reset operation for each required diameter and this is accomplished measuring a calibrated sample having the required diameter. This therefore makes it difficult to measure a plurality of diameters on the same part. Moreover, since these gauges supply the measuring unit of the machine only with an indication of the difference between the actual diameter and the theoretical diameter, the actual diameter is ascertained only after some calculations.

There are also known absolute gauges for diameters in which the two feelers are carried by two arms disposed on the same side of the workpiece and rotatable to approach the workpiece itself. After this rotation, a feeler is first brought into contact with the workpiece to be measured and the other feeler is thereafter brought into the measuring position. In one of these known absolute gauges, the sequence of these movements is controlled by two microswitches actuated by the feelers themselves during their movement. This gauge has the disadvantages of being tricky to operate and of having a rather long time of approach to the part.

In another of these known absolute gauges, the two feelers are shifted simultaneously by means of two opposed worms and nuts as far as a given zero position. The measurement of the diameter of the workpiece is effected as the difference between the distance between the feelers and the distance from the feelers to the workpiece. These gauges have the disadvantage that the measurement is not very precise, for which reason they are not usable for certain machining operations.

SUMMARY OF THE INVENTIONS

The aforesaid disadvantages are obviated by the invention, which provides a diameter gauge for a machine tool comprising two feelers adapted to be actuated by two fluodynamic devices to sense two diametrically opposite points of a workpiece during machining, and in which a position transducer is associated with the feelers for supplying an electrical signal indicative of the relative distance between the feelers, the feelers being carried by two opposite and parallel arms each extending from a corresponding sleeve connected resiliently to the corresponding fluodynamic device, the said sleeves being coaxial and guided slidably one on the other.

BRIEF DESCRIPTION OF THE DRAWINGS

The invention will be described in more detail, by way of example, with reference to the accompanying drawings, in which:

FIG. 1 is a longitudinal section of a diameter gauge embodying the invention;

FIG. 2 is a section on the line II—II of FIG. 1;

FIG. 3 is a section on the line III—III of FIG. 1.

DESCRIPTION OF THE PREFERRED EMBODIMENT

The diameter gauge embodying the invention is adapted to measure the diameters of a part of workpiece of circular cross-section. More particularly, the gauge is adapted to measure the workpiece during machining to control, for example, the feed of the tool. To this end, the gauge may be fitted to the frame of the machine tool, which may be a lathe, a milling machine or a grinder.

Referring to FIG. 1, a guide 5 is fixed to the frame of the machine and a slide 4 carrying the frame 6 of the diameter gauge is slidable on the guide 5. The guide is arranged transversely of a workpiece 3 which is being machined and is fixed in known manner to the machine. The gauge is moreover disposed on the opposite side with respect to a tool 2, so as to supply the measurement of the actual diameter continuously during the working cycle. The slide 4 is slidable on the guide 5 perpendicularly to the workpiece, for example by means of a hydraulic device not shown in the drawing, to allow the bringing up and moving away of the gauge at the beginning and end of the measuring operation.

The gauge comprises two vertical feelers 7 and 8 carried by two horizontal and parallel arms 9 and 10. The feelers 7 and 8 can slide vertically in the two arms 9 and 10 and are clamped in the latter by means of set screws 11 and 12.

The arm 9 is integral with a block 13 of substantially rectangular form (FIG. 2) tapered towards the end adjacent the arm 9. The block 13 is fixed to a sleeve 14 (FIG. 1) slidable vertically on two rows of balls 15 and 16 carried by a cage 17, which is also slidable vertically. The balls 15 and 16 slide vertically on a shaft 18, the ends of which are fixed to the frame 6 of the gauge.

The diameter gauge comprises a position detector which is constituted by a slider element 19 and a scale element 34, movable vertically one with respect to the other and substantially of the type described in United States Pat. No. 2,799,835. The slider element 19 is the detector, and comprises a pair of multipolar primary windings (not shown in detail) which are offset so as to be spatially out of phase with one another and are in the form of printed circuits mounted on a board 45 of insulating material and fixed to the element 19. The ends of the windings are connected to four terminals 46.

The scale element 34 comprises a multipolar secondary winding which is also in the form of printed circuit (not shown in detail) on a board 47 of insulating material fixed to the element 34. The ends of the secondary winding are connected to two terminals 48.

The position detector is connected through the terminals 46 and 48 of the primary and secondary windings to an electronic apparatus not shown in the drawing, for example of the type described in our Italian Pat. No. 737,711. This apparatus comprises an analog-todigital converter, which enables the device to give from time to time a numerical value of the measurement effected. This apparatus moreover permits the resetting of the detector in a predetermined position and the visual display of the numerical values of the other positions in relation to this predetermined position.

Connected to the element 19 is a shaped block 20 which bears a pin 21 at its upper end. Another pin 22 is fast with a hydraulic piston 23 slidable in a cylinder 24 and normally arrests the pin 21 and, therefore, the blocks 13 and 20 and the element 19 are in opposition to the action of a spring 25 (FIG. 3). This spring is attached by its upper end to a drilled pin 26 carried by a plate 50 fixed to the frame 6 of the gauge. The spring 25 is attached at its lower end to a pin 27 fast with the block 13.

The arm 10 (FIG. 1) is integral with another block 28 of a form similar to that of the block 13 and fixed to a second sleeve 29. This sleeve is slidable vertically on two rows of balls 30 and 31 carried by cages 32 and 33, respectively. Fixed to sleeve 29 is a pin 42 to which the lower end of a spring 40 is attached. The upper end of the spring 40 is attached to another pin 41, which is drilled and carried by the plate 50.

The balls 30 slide vertically on the shaft 18, while the balls 31 slide vertically on the surface of the sleeve 14. At the other end of the block 28 is fixed the other element or scale 34 of the position detector, which is connected to a block 35 carrying a pin 36 at its free end. Another pin 37 is fast with a second hydraulic piston 38 slidable in another cylinder 39 and normally arrests the pin 36 in opposition to the action of the gravity of the blocks 28 and 35 and of the element 34. The spring 40 therefore has the function of partially counterbalancing the weight of these components.

The delivery of the oil to the cylinders 24 and 39 and the discharge of the oil from them is effected through pipes, of which there are shown in FIGS. 1 and 2 and pipes 43 and 44 for inlet to the lower chambers of the cylinders. These pipes are connected to a hydraulic control unit, not shown in the drawing, in a manner known per se.

In operation, the workpiece 3 to be measured having been fixed, for example between the centres of the machine tool, oil under pressure is sent through the appropriate pipes so that the piston 23 is urged downwardly and the piston 38 is urged upwardly. In consequence of this, the pin 22 pushes the pin 21 downwardly against the force of the spring 25 and therefore pushes the arm 9 and the feeler 7 downwardly. Simultaneously, the piston 38 pushes the pin 36 upwardly through the medium of the pin 37. This causes the arm 10 and, consequently, the feeler 8 to be shifted upwardly.

By acting on the hydraulic control device for the slide 4, the slide 4 is now moved towards the workpiece 3 so as to bring the two feelers 7 and 8 into the vertical plane passing through the axis of the centres between which the workpiece 3 itself is fixed. To effect the bringing up of the feelers 7 and 8 up to the workpiece 3, the oil is now delivered into the lower part of the cylinder 24 and into the upper part of the cylinder 39. The piston 23 therefore moves upwardly and the piston 38 downwardly. The pin 22 of the piston 23 thus leaves the pin 21, as a result of which the spring 25 causes the sleeve 14 to slide on the shaft 18 and shift the arm 9 upwardly. The feeler 7 is therefore brought into contact with the workpiece 3. In turn, the pin 37 of the piston 38 leaves the pin 36, as a result of which, through the effect of the force of gravity, the sleeve 29 slides downwardly on the shaft 18 and on the sleeve 14, causing the arm 10 to move downwardly. The feeler 8 is therefore brought into contact with the workpiece 3. The springs 25 and 40 are calibrated so that contact of the feelers 7 and 8 with the workpiece 3 is ensured with a pressure such as not to introduce errors into the measurement. These errors in measurement may arise either because the feelers 7 and 8 do not maintain contact with, or follow, the workpiece 3 perfectly owing to insufficient pressure or because excessive pressure causes elastic deformations in the arms 9 and 10 and owing to the effect of possible rebounds and vibrations of the feelers 7 and 8 on the workpiece.

In consequence of the position assumed by the feelers 7 and 8, the two elements 19 and 34 constituting the position detector assume a corresponding relative position, which is detected by the relative shifting between the secondary winding and the pair of primary windings.

In order to obtain the numerical value of the measurement of the diameters, the origin of the numerical values supplied by the electronic apparatus must correspond to a diameter of zero value detected by the diameter gauge or measuring device. To obtain this, it is necessary to effect a calibration operation. To this end, a sample workpiece of known diameter is mounted on the machine tool and the measurement is effected as described hereinbefore. In general, the electronic apparatus does not supply the numerical value corresponding to the diameter of the sample workpiece, because the origin of the numerical values supplied is offset by a certain value with respect to the zero diameter. As is known, the electronic apparatus comprises zero-setting means for shifting the origin of the numerical values supplied. By acting on these means, the result of the measurement is varied until it is caused to coincide with the known value of the sample diameter. This calibration operation is effected at the beginning of a series of measurements and serves for all the succeeding measurements. The calibration operation may, however, be effected in any known manner, for example by means of calipers.

In FIG. 1, the two arms 9 and 10 are located substantially in the position of maximum opening, so that the diameter of the workpiece 3 shown in the drawings is substantially the maximum measurable. The range of the diameters measurable by the gauge corresponds substantially to the vertical travel of the two arms 9 and 10. The minimum diameter measurable is indicated in FIG. 1 by the dashed lines.

However, by changing the position of the feelers 7 and 8 with respect to the arms 9 and 10 by means of the securing screws 11 and 12, it is possible to translate this range of measurement to include substantially the maximum diameter, which is a little less than the maximum distance which can be reached by the arms 9 and 10. The range of measurement can also be translated to include zero diameter.

It is therefore clear that the feelers 7 and 8 are movable in opposite directions at the same time with a high degree of relative movement to provide a high speed of approach of the feelers to the workpiece.

It is moreover clear that the diameter gauge is safe and reliable in operation, since the movement of the feelers is not controlled by microswitches.

Other embodiments and modifications will become apparent to those skilled in the art from the above description, but it should be understood that the invention is limited only by the scope of the appended claims.

We claim:

1. A diameter measuring gauge for a machine tool comprising
   a pair of opposed feelers for contacting opposed points of a workpiece each said feeler being mounted respectively on an arm,
   a pair of sleeves slidable relative to one other, each of said sleeves supporting one of said arms,
   a shaft, substantially parallel to the plane of movement of said feelers, said sleeves being slidably and coaxially mounted on said shaft, one of said sleeves including an annular portion spaced from said shaft and having an inner surface overlying the outer surface of said other sleeve in telescopic relationship thereto, the other of said sleeves overlying the surface of said shaft,
   fluodynamic means connected to each of said sleeves to move said sleeves relative to one other, and
   electrical means connected to said sleeves for sensing the position of one of said feelers with respect to the other of said feelers and generating an electrical signal indicative thereof.

2. A gauge according to claim 1 further comprising first rolling bearing means disposed the length of said other sleeve for movably supporting said other sleeve on said shaft and second rolling bearing means interposed between said inner surface of said annular portion of said one sleeve and said outer surface of said other sleeve.

3. A gauge according to claim 1 wherein said fluodynamic means comprises a pair of hydraulic motors arranged in parallel to one another, said hydraulic motors each being operatively counterconnected with said pair of sleeves for moving said sleeves in opposite directions, thereby moving said feelers relative to said workpiece.

4. A gauge according to claim 3 wherein said feelers, said arms and said sleeves are in vertical alignment with one another, the upper one of said sleeves being connected to its respective said hydraulic motor by means of a one-way coupling allowing only upward motion to be imparted by said hydraulic motor and having a first tension spring connected between the frame of the machine tool and said upper sleeve to bias said upper sleeve upwardly with a predetermined force, the lower one of said sleeves being connected to its respective hydraulic motor by means of a one-way coupling allowing only downward motion to be imparted by said hydraulic motor and having a second tension spring connected between the frame of said machine tool and said lower sleeve to bias said lower sleeve upwardly with a predetermined force, said upper feeler contacting the workpiece under the action of gravity partially counterbalanced by said first tension spring and said lower feeler contacting the workpiece under the action of said second tension spring, whereby said hydraulic motors drive said sleeves apart to allow the workpiece to be interposed between said feelers.

5. A gauge according to claim 3 wherein said arms are parallel to one another.

6. A gauge as claimed in claim 1, wherein said electrical means comprises a first electrical winding mounted on a first board fixed to one of said sleeves and a second electrical winding mounted on a second board fixed to the other of said sleeves and spaced from said first board by an air gap and electrically coupled across said air gap to said first winding, said boards being movable with said sleeves to alter the electrical coupling across said gap thereby indicating the relative displacement of said sleeves.

* * * * *